(12) United States Patent
Horkko et al.

(10) Patent No.: US 9,061,836 B2
(45) Date of Patent: Jun. 23, 2015

(54) MOVABLE PROCESS DEVICE FOR MINERAL MATERIAL PROCESSING

(75) Inventors: Timo Horkko, Viiala (FI); Mikko Asikainen, Tampere (FI); Pasi Overmark, Kangasala (FI); Tuomas Tuokko, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 12 days.

(21) Appl. No.: 13/985,703

(22) PCT Filed: Feb. 15, 2011

(86) PCT No.: PCT/FI2011/050139
§ 371 (c)(1),
(2), (4) Date: Sep. 25, 2013

(87) PCT Pub. No.: WO2012/110679
PCT Pub. Date: Aug. 23, 2012

(65) Prior Publication Data
US 2014/0048382 A1 Feb. 20, 2014

(51) Int. Cl.
*B65G 47/20* (2006.01)
*B65G 41/00* (2006.01)
*B02C 21/02* (2006.01)
*B65G 37/00* (2006.01)

(52) U.S. Cl.
CPC .............. *B65G 47/20* (2013.01); *B65G 41/002* (2013.01); *B02C 21/026* (2013.01); *B02C 21/02* (2013.01); *B65G 37/00* (2013.01)

(58) Field of Classification Search
CPC ..... B65G 47/20; B65G 41/002; B02C 21/026

USPC ........................ 198/300, 311, 312, 313, 317
See application file for complete search history.

(56) References Cited

U.S. PATENT DOCUMENTS

| | | | |
|---|---|---|---|
| 3,863,783 A * | 2/1975 | Spellman, Jr. ................ | 414/523 |
| 5,564,205 A * | 10/1996 | Smith .............................. | 37/93 |
| 8,221,047 B2 * | 7/2012 | Petersen et al. ............... | 414/523 |
| 8,561,929 B2 * | 10/2013 | Davis ..................... | 241/101.741 |
| 8,627,947 B2 * | 1/2014 | Houssian ...................... | 198/668 |
| 2006/0016104 A1 * | 1/2006 | Viitasalo et al. ................ | 37/307 |
| 2008/0121744 A1 * | 5/2008 | Majuri et al. ............ | 241/101.77 |

FOREIGN PATENT DOCUMENTS

| | | |
|---|---|---|
| AU | 2009321716 | 6/2010 |
| DE | 10 2008 060 459 A1 | 6/2010 |
| EP | 1 110 625 A2 | 6/2001 |

(Continued)

OTHER PUBLICATIONS

PCT International Search Report dated May 12, 2011.
(Continued)

*Primary Examiner* — Leslie A Nicholson, III
(74) *Attorney, Agent, or Firm* — Andrus Intellectual Property Law, LLP

(57) ABSTRACT

A movable processing apparatus for mineral material processing comprises a movable frame and a side conveyor which is attached to the frame, and a pivot joint for the side conveyor which pivot joint is attached between the side conveyor and the frame, and the side conveyor is pivotable horizontally around the pivot joint to one or more operating positions at least on one side of the processing apparatus and to a transportation position.

20 Claims, 3 Drawing Sheets

(56) References Cited

FOREIGN PATENT DOCUMENTS

| JP | 9-85118 A | 3/1997 |
| JP | 11-140907 A | 5/1999 |
| JP | 2005-138005 A | 2/2005 |
| WO | 2006/051165 A1 | 6/2006 |
| WO | 2010/063464 A1 | 6/2010 |

OTHER PUBLICATIONS

PCT Written Opinion dated May 12, 2011.
Second Written Opinion dated Jun. 6, 2013.
Int'l Preliminary Report on Patentability (IPRP) dated Jun. 20, 2013.
Japanese Office Action for JP Application No. 2013-552990, issued Jan. 7, 2015.
English Translation of Japanese Office Action for JP Application No. 2013-552990, issued Jan. 7, 2015.
Patent Abstracts of Japan—Application No. 2005-138005, published Feb. 6, 2005.
Patent Abstracts of Japan—Publication No. 11-140907, published May, 25, 1999.
English Abstract Translation of JP 9-85118, published Mar. 31, 1997.

\* cited by examiner

MOVABLE PROCESS DEVICE FOR MINERAL MATERIAL PROCESSING

CROSS-REFERENCE TO RELATED APPLICATIONS

This application claims priority to PCT/FI2011/050139, filed Feb. 15, 2011, and published in English on Aug. 23, 2012 as publication number WO 2012/110679, incorporated herein by reference.

FIELD OF THE INVENTION

The invention relates to a movable processing apparatus which is suitable for mineral material processing. Particularly, though not exclusively, the invention relates to a movable processing apparatus which comprises a side conveyor apparatus and which is suitable for crushing, pre-screening, screening and/or conveying further mineral material.

BACKGROUND OF THE INVENTION

Rock is gained from the earth for crushing by exploding or excavating. Rock can also be natural and gravel or construction waste. Mobile processing apparatuses (for example, crushing apparatuses) and stationary crushing applications are used in material processing (for example, crushing). An excavator or wheeled loader, for example, loads the material to be processed into the crusher's feed hopper from where the material to be processed ends up in a feeder which feeds the rock material, for example, in a jaw of a crusher or the feeder moves the rock material towards the crusher. A desired material, for example, fine material can be directed through the feeder to a side conveyor that this material does not result in further processing, for example, crushing. A usual location of the side conveyor is under the feeder where selected material can drop. Material directed past the further process is conveyed aside the processing apparatus by means of the side conveyor, for example, in a pile.

In movable crushing apparatuses, for example, the side conveyor forms during transportation an obstacle which broadens the crushing apparatus and which has to be located, at least in road traffic, in a narrower space than an operating position of the side conveyor. Usually, the side conveyor is folded at a side of the machine for the time of the transportation, for example, hydraulically upwards in a vertical position. The conveyor is then, for example, of a model which is foldable at a region of a conveyor belt. Another option is to transport the side conveyor loosely.

When a discharge direction of the side conveyor is desired to be changed to another side of a machine the side conveyor is released completely from fixing points, for example, by opening and fixing a bolt attachment of the side conveyor. Hydraulic hoses are detached, the side conveyor is lifted away from an opening in a side plate of the machine, transported to the other side of the machine and mounted again. An alternative in machines of today is that a sidedness of the side conveyor is not changeable.

Hydraulic cylinders and joints are used in a structure of the side conveyor which is foldable at the side the crushing apparatus which enable locating the side conveyor at a side of the crushing apparatus. This structure is complicated, expensive and fault-sensitive. Both the transportation of the side conveyor loosely and the changing of the side are time consuming. A lifting device and sufficiently lifting aid has to be on the scene. Lifting work is a safety risk and requires several operators. Hydraulic hoses and electric cables must also be detached both when transported separately and when the side is changed which causes safety risks to personnel and environment.

An object of the invention is to provide a movable processing apparatus for mineral material in connection with which problems related to known side conveyors can be avoided or at least reduced.

SUMMARY

According to the invention there is provided a movable processing apparatus for mineral material processing which comprises a movable frame and a side conveyor which is attached to the frame, and the movable processing apparatus comprises a pivot joint for the side conveyor which pivot joint is attached between the side conveyor and the frame, and the side conveyor is pivotable horizontally around the pivot joint to one or more operating positions at least on one side of the processing apparatus and to a transportation position.

Preferably the side conveyor is pivotable to the transportation position from at least one side of the frame in direction of the frame such that a transportation width of the processing apparatus is not exceeded.

The transportation width is preferably a transportation width of a vehicle which is transported in road traffic without an abnormal transport permit. Usually, the movable processing apparatuses are dimensioned at their broadest point (for example, frame, tracks or wheels) inside this transportation width.

Preferably the side conveyor is pivotable to a first side of the frame and to a second side of the frame and to operating positions in a pivoting sector between the first side and the second side.

Preferably the horizontally pivoting sector of the side conveyor is 180 degrees.

Preferably the pivot joint comprises a bottom part which is attached to the frame and an upper part which is bearing-mounted to the bottom part in which the upper part the side conveyor is attached. Preferably the bottom part of the pivot joint comprises a housing and the upper part comprises a shaft which is sliding bearing-mounted to the housing. Preferably a sliding bearing bushing is arranged between the housing of the bottom part and the shaft of the upper part, and the sliding bearing bushing is pivotable from outside the pivot joint.

Preferably the upper part of the pivot joint comprises an upwards inclined mounting bed for the side conveyor.

Preferably the side conveyor comprises a side conveyor frame which is assembled of linear profiles.

Preferably the transportation position of the side conveyor is under the frame of the processing apparatus.

A locking of the side conveyor in the horizontal pivoting direction may be arranged by means of a locking pin or a locking latch to be arranged between the bottom part and the upper part of the pivot joint, which locking pin or locking latch is fixable in a locking position and openable from the locking position.

The processing apparatus may be equipped with a locking device which is arranged between a rear part of the frame and a discharge end of the side conveyor.

The side conveyor can be pivoted manually around the pivot joint to different positions. If desired, the side conveyor can be directed to any operating direction in the pivoting sector of 180 degrees from the first side to the second side of the processing apparatus. The side conveyor can be pivoted to operating positions to both sides of the processing apparatus. The side conveyor can be locked in an operating position mechanically in a simple way, for example, by means of the locking pin or the locking latch which is arranged in connection with the pivot joint. The operator may pivot the side conveyor and lock the side conveyor in a pivoted position quickly and safely without lifting aid.

The side conveyor can be pivoted in the transportation position in the direction of the frame of the processing apparatus. The side conveyor can be pivoted in the transportation position under the frame of the processing apparatus. In the transportation position, the side conveyor can be locked in the pivoted direction mechanically, for example, by means of the locking pin which is arranged in connection with the pivot joint. Additionally or alternatively (for example, when the processing apparatus is transported in the road traffic), the operator can lock the side conveyor to the frame of the processing apparatus. A preferable way is to lock the side conveyor by means of a rear wing of a feed hopper which is arranged in the frame of the processing apparatus. The side conveyor may be attached to the frame of the processing apparatus, for example, at its discharge end by the rear wing of the feed hopper or another locking device which is arranged in the frame of the processing apparatus.

The pivotable side conveyor is functionally better, cheaper and more safe than known solutions. The pivoting solution of the side conveyor is a simple mechanical structure working with muscular force. As a particular advantage can be seen the pivoting of the side conveyor to different positions and a putting in transportation condition without hydraulic actuators. Hoses of hydraulics moving a conveying base of the side conveyor such as an endless belt can be all the time coupled. Also electric cables must not be detached. The side conveyor must not be detached from the processing apparatus for the putting in transportation condition, for the transportation or for the changing of the side. No lifting devices or other tools are needed for pivoting or the transportation of the side conveyor. One operator can fast change the side or put in transportation condition the side conveyor. Safety can be enhanced because lifting work and detaching of the hydraulic hoses are not needed. In some known side conveyor solutions, tightening and positioning of the conveyor belt is needed in connection with the putting in transportation condition what may be avoided in solutions according to the invention.

The side conveyor may be pivoted momentary away from its operating position and returned back to the operating position. The side conveyor may be pivoted, for example, aside out of the way of a pile when it is desired to get the material away as efficient as possible with a wheeled loader.

Also during use of the processing apparatus, the side conveyor may be pivoted in a protected state away from its operating position if it is not desired to operate the side conveyor. Additionally, during the transportation the side conveyor does not take space around the movable processing apparatus or at a working site.

Different embodiments of the present invention will be illustrated or have been illustrated only in combination with one or some aspects of the invention. A person skilled in the art understands, that any embodiment of one aspect of the invention may be applied in the same aspect of the invention and in other aspects alone or as a combination with other embodiments.

BRIEF DESCRIPTION OF THE DRAWINGS

The invention will be described, by way of example, with reference to the accompanying drawings, in which.

DETAILED DESCRIPTION

In the following description, like numbers denote like elements. It should be appreciated that the illustrated drawings are not entirely in scale, and that the drawings mainly serve the purpose of illustrating embodiments of the invention.

FIGS. 1 to 4 show a movable mineral material processing apparatus 1 comprising a frame 2. The processing apparatus comprises tracks 3, attached to the frame, for moving the processing apparatus and a side conveyor 4 which can be pivoted from a side to another side of the processing apparatus. The processing apparatus can be equipped with, for example, mineral material screening, conveying and/or crushing means (not shown in the figures). The crushing means may comprise, for example, a cone, a gyratory or an impact crusher.

A movable or mobile processing apparatus may also be movable on wheels, skids or legs. An alternative for moving the processing apparatus is forming the frame of the processing apparatus as a base having wheels which is towable by a vehicle.

Figure 1:
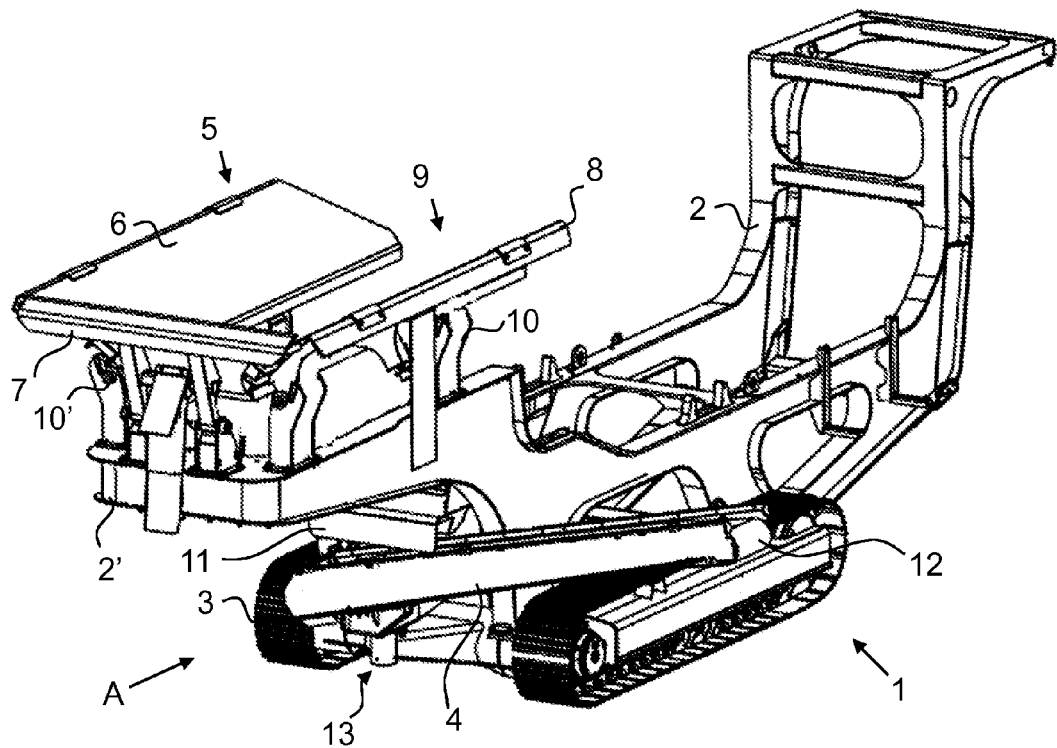
FIG. 1 shows a movable mineral material processing apparatus according to a preferable embodiment comprising a side conveyor which can be pivoted from one side to another side of the processing apparatus.
Figure 2:
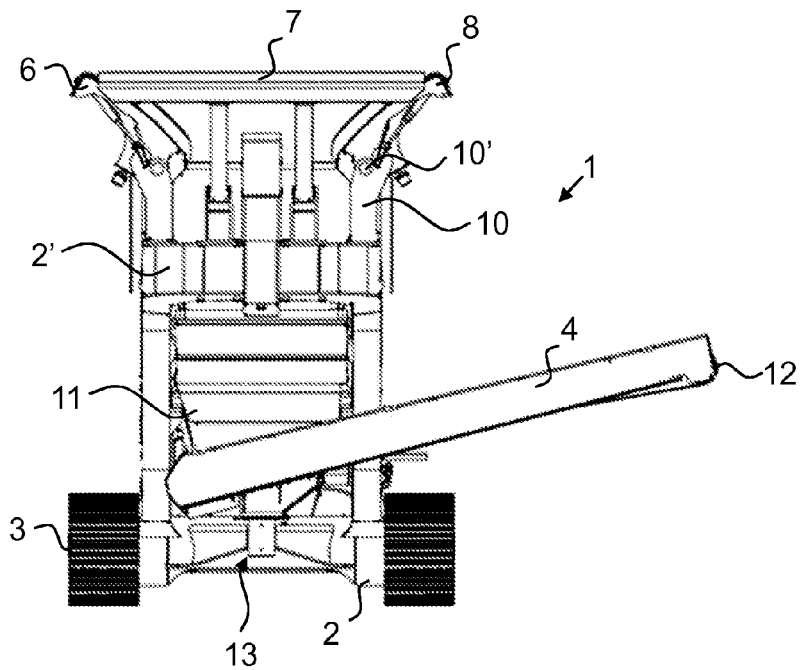
FIG. 2 shows the processing apparatus of FIG. 1 illustrated in a rear view from the direction of an arrow A of FIG. 1 and the side conveyor is pivoted at a side of the processing apparatus.
Figure 6:
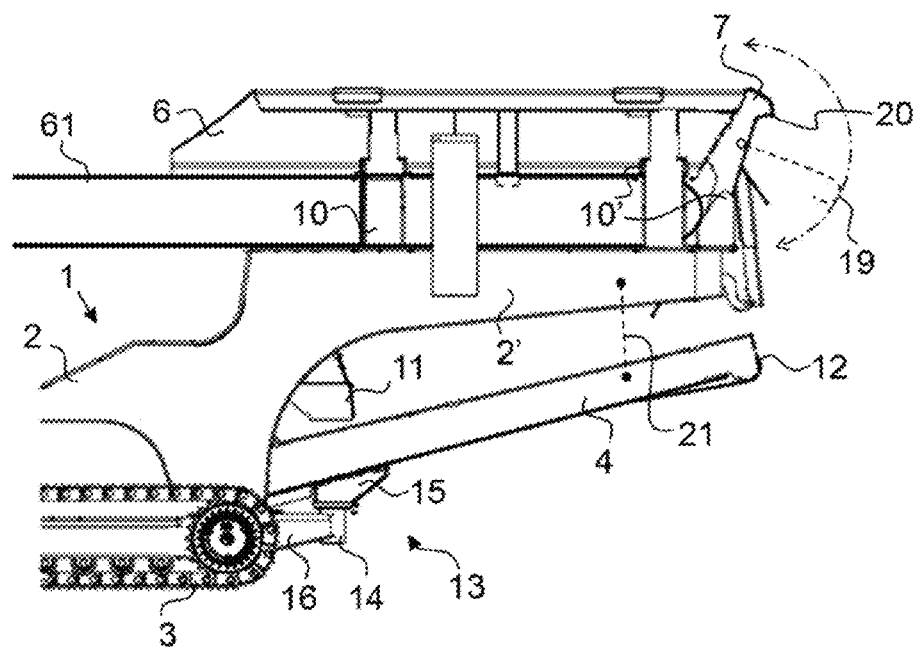
FIG. 6 shows the processing apparatus of FIG. 1 equipped with a feeder.

In FIG. 1, a feed hopper 5 is arranged in a rear part 2' of the frame 2 through which the material to be processed is received in the processing apparatus. Wings 6, 7, and 8 forming the feed hopper can be folded away from an operating position. A feeder 61 (see FIG. 6) is arranged between and under the wings of the feed hopper, with which feeder the material loaded in the feed hopper is fed forward through an open front part 9 of the feed hopper. The feed hopper comprises a first side wing 6, a rear wing 7 and a second side wing 8 which are attached to the frame 2 through supports 10, The supports 10 are equipped with pivoting joints 10' for folding the side wings and the rear wing downwards to sides of the processing apparatus 1 during transportation and storage, for example. When the wings 6, 7, and 8, equipped with hydraulic actuators, of the feed hopper 5 are folded, the feeder 61 for the material to be processed can be mounted on the frame 2 as shown in FIG. 6. The feeder 61 can be put in operating position by folding up the wings of the feed hopper in the operating position. Mineral material screening, conveying, and/or crushing means can be located on the frame next to the feeder.

Desired material, for example, fine material can be directed via the feeder or through the feeder to drop via a material guide 11 to a belt 12 or a corresponding endless conveying base of the side conveyor 4 that this material does not result in further processing. A starting end of the side conveyor 4 is preferably located under the feeder.

Figure 4:
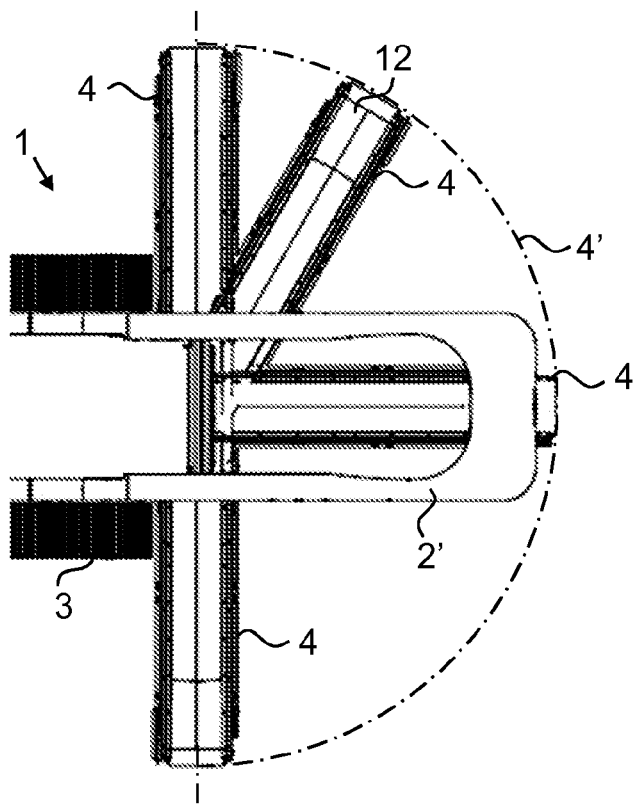
FIG. 4 shows a pivoting region of the side conveyor of the processing apparatus of FIG. 1.

The side conveyor 4 can be pivoted from one side to another side of the processing apparatus 1. A pivot joint 13 is arranged in the processing apparatus 1 for the side conveyor by means of which the side conveyor is attached to the frame 2. The side conveyor can be pivoted, if necessary, manually around the pivot joint in different positions. The side conveyor can be directed, if necessary, in any direction in a pivoting sector 4' of 180 degrees from a first side to a second side of the processing apparatus (FIG. 4). The side conveyor can be pivoted in the pivoting sector 4' between operating positions and a transportation position.

Simplest the side conveyor can be pivoted to one side of the processing apparatus to an operating position. Preferably the side conveyor can be pivoted to both sides of the processing apparatus to operating positions. The side conveyor can be arranged in an operating position in any direction in a region of the pivoting sector 4'.

Figure 5:
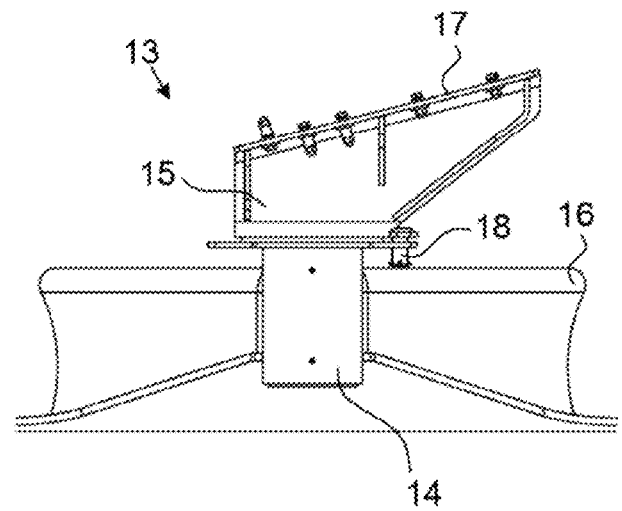
FIG. 5 shows a pivot joint of a side conveyor according to a preferable embodiment.

FIG. 5 shows a pivot joint 13 comprising a bottom part 14 and an upper part 15. The bottom part and the upper part are forming together the pivot joint in which preferably the bottom part acts as a housing in which a shaft-like part of the upper part is sliding bearing-mounted. A suitable lubrication and a necessary amount bearing members are arranged in the housing for enabling pivoting the joint manually. Preferably lubrication nipples are arranged in a side of the housing. A plastic bearing sleeve may be arranged between the housing of the bottom part and the shaft of the upper part.

According to some embodiments the manual pivoting of the side conveyor can be made easier instead of or additionally to a pivoting force which is directed directly to the side conveyor. A sliding bearing bushing can be arranged between the housing of the bottom part and the shaft of the upper part, and the sliding bearing bushing is pivotable from outside the pivot joint. Such a sliding bearing bushing equipped with a pivoting axis having an inclined direction in relation to vertical direction can be equipped with a pivot lever for the operator.

The bottom part 14 of the pivot joint is equipped with a fastening member 16 through which the bottom part is attached to the frame 2, for example, to a rear beam of the frame. The fastening member 16 is preferably a cantilever beam with plate structure which is attached by welding to the frame of the processing apparatus. The upper part 15 of the pivot joint is equipped with a mounting bed 17 to which the side conveyor 4 is attached. An inclination of a mounting surface of the mounting bed 17 relative to a support surface (earth surface) of the processing apparatus is preferably selected such that a frame structure of the side conveyor manufactured of linear profiles can simply be mounted on the mounting bed. In this way, one can stick by a minor amount of parts to be manufactured and assembled and one can save in manufacturing costs of the side conveyor.

The side conveyor 4 can be locked in its pivoting direction to one or several operating positions and, if necessary, to a transportation position. A locking of the operating position is implemented, for example, by a locking pin 18 which is arranged in connection with the pivot joint 13. In locking positions, the locking pin 18 passes through holes or corresponding locking forms for the locking pin which act together, formed in the upper part 15 and bottom part 14 of the pivot joint. The operator can pivot and lock the side conveyor in different positions fast and safe without lifting devices.

A transportation position of the side conveyor 4 is illustrated with FIG. 4 where the side conveyor is pivoted in the direction of the processing apparatus 1. Preferably the side conveyor 4 is under the frame 2 of the processing apparatus in the transportation position. Thus, the outer dimensions of the processing apparatus do not increase at least substantially when the side conveyor is in the transportation position. Width of the processing apparatus has not necessary to be increased when the processing apparatus is put in the transportation position, and a minimal lengthening of the processing apparatus is not so detrimental as broadening. Naturally, the side conveyor can be arranged to discharge also in the direction of the processing apparatus (backwards). In the transportation position, the side conveyor can be locked in the pivoting direction mechanically by means of the locking pin 18 but also other ways of locking can be used.

Figure 3:
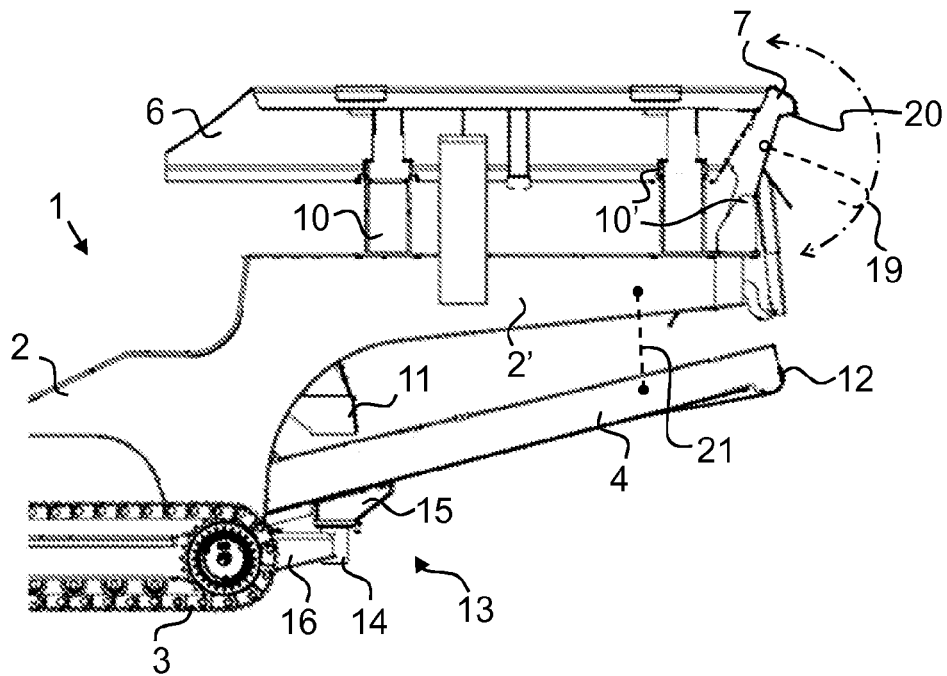
FIG. 3 shows the processing apparatus of FIG. 1 illustrated in a side view and the side conveyor is pivoted backwards under a frame of the processing apparatus.

FIG. 3 shows alternative locking devices for holding the side conveyor 4 in place in the transportation position. An advantageous way is to lock the side conveyor to the frame of the processing apparatus. Then, the frame bears a part of the free end of the side conveyor what indeed is not necessary in all embodiments. The side conveyor can be locked to the frame of the processing apparatus, for example, by means of the rear wing 7 of the feed hopper which rear wing is attached to the rear part 2' of the frame. The rear wing 7 is pivoted downwards in a transportation position for the processing apparatus not being overly high for transportation. The side conveyor 4, pivoted in direction of the rear wing, can be locked by means of a suitable locking member 19 (for example, a hook) which is arranged in the rear wing 7. A locking shape 20 can be made in the rear wing such that the side conveyor 4 is locked in the transportation position when the rear wing is in downward position. A detachable and attachable fastening member 21 (for example, a threaded rod, a rigging screw, a chain) can be arranged between the rear part 2' of the frame and the side conveyor, which rear part extends above the side conveyor when the side conveyor is pivoted in the direction of the frame.

Design of the rear part 2' of the frame 2 and combination of the pivot joint 13 which enables the pivoting of the side conveyor 14 with a suitable shaped rear part 2' are bearing a significant role in the free pivotability of the side conveyor. Next to the tracks 3, the rear part 2' opens backwards in a highly upwards inclined direction when the processing apparatus 1 is seen in a side view. At the side of the frame of the processing apparatus there are no horizontal beams of known frames directed horizontally backwards (next to the tracks), and through an opening above these horizontal beams, formed by the horizontal beams, the detachable and attachable known side conveyor is mounted inside the frame under the feeder. Thus, one has been able to make the frame 2 inexpensive. In some embodiments, a projection of the frame, seen in a top view, covers the side conveyor which is directed backwards. Additionally, the frame 2 provides under the rear part 2' a sufficient high free space for pivoting the side conveyor from one side to another side and backwards. Simultaneously, the frame is suitable high for mounting the feeder directly onto the rear part 2' of the frame without a separate auxiliary frame, what further makes the structure solution of the processing apparatus cost effective.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of the principles of the invention, and not in limitation thereof. Hence, the scope of the invention is only restricted by the appended patent claims.

The invention claimed is:

1. A movable processing apparatus for mineral material processing, comprising:
   a movable frame comprising a rear part of the frame through which the movable frame is configured to receive material for processing in the processing apparatus;
   wings configured to form a feed hopper in the rear part of the frame;
   a feeder positioned between and under the wings;
   a side conveyor attached to the frame, a starting end of the side conveyor being located under the feeder; and
   a material guide on the side conveyor configured to receive material dropping from the feeder and to prevent further processing of the material dropping from the feeder in the movable processing apparatus, wherein
   the rear part of the frame opens backwards in a highly upwards inclined direction; and
   the movable processing apparatus comprises a pivot joint configured to attach the side conveyor to the frame so that the side conveyor is pivotable horizontally around the pivot joint to one or more operating positions or at least on one side of the processing; apparatus and to a transportation position under the rear part of the frame.

2. The movable processing apparatus according to claim 1, wherein the side conveyor is pivotable to the transportation position from at least one side of the frame in direction of the frame such that a transportation width of the processing apparatus is not exceeded.

3. The movable processing apparatus according to claim 1, wherein the side conveyor is pivotable to a first side of the frame and to a second side of the frame and to operating positions in a pivoting sector between the first side and the second side.

4. The movable processing apparatus according to claim 1, wherein the horizontally pivoting sector of the side conveyor is 180 degrees.

5. The movable processing apparatus according to claim 1, wherein the pivot joint comprises a bottom part which is attached to the frame and an upper part which is bearing-mounted to the bottom part, wherein the side conveyor is attached to the upper part.

6. The movable processing apparatus according to claim 5, wherein a locking of the side conveyor in the horizontal pivoting direction is arranged by a locking pin or a locking latch to be arranged between the bottom part and the upper pan of the pivot joint, which locking pin or locking latch is fixable in a locking position and openable from the locking position.

7. The movable processing apparatus according to claim 1, wherein the pivot joint comprises a bottom part which is attached to the frame and an upper part which is bearing-mounted to the bottom part, wherein the side conveyor is attached to the upper part, and the bottom part of the pivot joint comprises a housing and the upper part comprises a shaft which is sliding bearing-mounted to the housing.

8. The movable processing apparatus according to claim 1, wherein the pivot joint comprises a bottom part which is attached to the frame and an upper pan which is bearing-mounted to the bottom part, wherein the side conveyor is attached to the upper part, and the bottom part of the pivot joint comprises a housing and the upper part comprises a shaft which is sliding, bearing-mounted to the housing, and the upper part of the pivot joint comprises an upwards inclined mounting bed for the side conveyor.

9. The movable processing apparatus according to claim 1, wherein the transportation position of the side conveyor is under the frame of the processing apparatus.

10. The movable processing apparatus according to claim 1, wherein the processing apparatus is equipped with a locking device which is arranged between a rear part of the frame and a discharge end of the side conveyor.

11. The movable processing apparatus according to claim 1, wherein the pivot joint comprises a bottom part which is attached to the frame and an upper pan which is bearing-mounted to the bottom part, wherein the side conveyor is attached to the upper part, and the upper pan of the pivot joint comprises an upwards inclined mounting bed for the side conveyor.

12. A movable processing, apparatus including a feeder and a processing apparatus for processing mineral material, comprising:
   a movable frame including a rear part of the frame through which the movable frame is configured to receive the mineral material for processing in the processing apparatus, the rear part of the movable frame opening backwards in a highly upward inclined direction;
   a feed hopper in the rear pan of the frame, the frame being farther configured to receive and support the feeder between and under wings forming the feed hopper;
   a side conveyor attached to the frame, a starting end of the side conveyor being located under the feeder when the side conveyor is supported by the frame;
   a material guide on the side conveyor configured to receive material dropping from the feeder when supported by the frame and to prevent further processing of the material dropping from the feeder in the movable processing apparatus; and
   a pivot joint configured to attach the side conveyor to the frame so that the side conveyor is pivotable horizontally around the pivot joint to one or more operating positions on at least one side of the movable processing apparatus and to a transportation position under the rear part of the frame.

13. The movable processing apparatus according to claim 12, wherein the side conveyor is pivotable to the transportation position from at least one side of the frame in direction of the frame such that a transportation width of the processing apparatus is not exceeded.

14. The movable processing apparatus according to claim 12, wherein the side conveyor is pivotable to a first side of the frame and to a second side of the frame and to operating positions in a pivoting sector between the first side and the second side.

15. The movable processing apparatus according to claim 12, wherein the pivot joint comprises a bottom part which is attached to the frame and an upper part which is bearing-mounted to the bottom part, wherein the side conveyor is attached to the upper part.

16. The movable processing apparatus according to claim 15, wherein a locking of the side conveyor in the horizontal pivoting direction is arranged by a locking pin or a locking latch to be arranged between the bottom part and the upper part of the pivot joint, which locking pin or locking latch is fixable in a locking position and openable from the locking position.

17. The movable processing apparatus according to claim 12, wherein the pivot joint comprises a bottom part which is attached to the frame and an upper part which is bearing-mounted to the bottom part, wherein the side conveyor is attached to the upper part, and the bottom part of the pivot joint comprises a housing and the upper part comprises a shaft which is sliding bearing-mounted to the housing.

18. The movable processing apparatus according to claim 12, wherein the pivot joint comprises a bottom part which is attached to the frame and an upper part which is bearing-mounted to the bottom part, wherein the side conveyor is attached to the upper part, and the bottom part of the pivot joint comprises a housing and the upper part comprises a shaft which is sliding bearing-mounted to the housing, and the upper part of the pivot joint comprises an upwards inclined mounting bed for the side conveyor.

19. The movable processing apparatus according to claim 12, wherein the transportation position of the side conveyor is under the frame of the processing apparatus.

20. The movable processing apparatus according to claim 12, wherein the processing apparatus is equipped with a locking device which is arranged between a rear part of the frame and a discharge end of the side conveyor.

* * * * *